United States Patent [19]
Blackard et al.

[11] Patent Number: 5,918,020
[45] Date of Patent: Jun. 29, 1999

[54] DATA PROCESSING SYSTEM AND METHOD FOR PACING INFORMATION TRANSFERS IN A COMMUNICATIONS NETWORK

[75] Inventors: Joe Wayne Blackard, Austin, Tex.; Richard Adams Gillaspy; William John Henthorn, both of Raleigh, N.C.; Lynn Erich Petersen, Raleigh, N.C.; Lance W. Russell, Hollister, Calif.; Gary Roy Shippy, Cary, N.C.

[73] Assignee: International Business Machines Corporation, Armonk, N.Y.

[21] Appl. No.: 08/808,930

[22] Filed: Feb. 28, 1997

[51] Int. Cl.⁶ .................................................. H04L 12/56
[52] U.S. Cl. ...................................... 395/200.58; 370/395
[58] Field of Search .................................... 370/232, 389, 370/395; 395/200.57, 200.58, 200.54

[56] References Cited

U.S. PATENT DOCUMENTS

| | | | |
|---|---|---|---|
| 4,736,369 | 4/1988 | Barzilai et al. | 370/94 |
| 5,063,562 | 11/1991 | Barzilai et al. | 370/94.1 |
| 5,386,512 | 1/1995 | Crisman et al. | 395/200 |
| 5,418,912 | 5/1995 | Christenson | 395/200 |
| 5,426,635 | 6/1995 | Mitra et al. | 370/60 |
| 5,446,726 | 8/1995 | Rostoker et al. | 370/17 |
| 5,517,622 | 5/1996 | Ivanoff et al. | 395/200.13 |

OTHER PUBLICATIONS

"A New Counting Window Pacing Scheme," *IBM Technical Disclosure Bulletin*, vol. 30, No. 3, Aug. 1987.
"Method and Apparatus for Data Flow Control on a Serial I/O Channel," *IBM Technical Disclosure Bulletin*, vol. 33, No. 11, Apr., 1991.
"Flow Control With Distributed Buffer Management," *IBM Technical Disclosure Bulletin*, vol. 35, No. 1A, Jun., 1992.
"IBM Video Charger Server for AIX, Version 1.1," *IBM Software Announcement*, Dec. 3, 1996.

*Primary Examiner*—Ellis B. Ramirez
*Assistant Examiner*—William Titcomb
*Attorney, Agent, or Firm*—John J. Timar; Winstead, Sechrest & Minick

[57] ABSTRACT

A data processing system and a method implement a unique push, or streaming, model for communicating time sensitive encoded data, such as video and audio data, in a communication network. A pacing mechanism is implemented in the data processing system to allow a client to pace a streaming server in a stable way such that a fill level of a client buffer will oscillate around a single threshold value. A simple protocol is implemented to protect pacing primitives, allow recovery for pacing primitives, and to keep a client and a server synchronized during the pacing operation. To implement the pacing mechanism, the streaming server transmits data at a slightly faster rate than it was encoded. Subsequently, a decoder circuit at the client, or receiver, uses the transmitted data at the encoded rate. Thus, the utilization of buffers in the client will gradually increase. When the utilization of buffers reaches a threshold level, the client provides a pacing message to the server. When the pacing message is received, the server withholds sending data for a period of time sufficient to drop the client buffer utilization to a level below a threshold level.

24 Claims, 7 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| SUBTYPE|   PT=APP=204  |             LENGTH            |
+-+-+-+-+-+-+-+-+-+-+-+-+-+-+-+-+-+-+-+-+-+-+-+-+-+-+-+-+-+-+-+-+
|                           SSRC/CSRC                           |
+-+-+-+-+-+-+-+-+-+-+-+-+-+-+-+-+-+-+-+-+-+-+-+-+-+-+-+-+-+-+-+-+
|                             NAME                              |
+-+-+-+-+-+-+-+-+-+-+-+-+-+-+-+-+-+-+-+-+-+-+-+-+-+-+-+-+-+-+-+-+
|                    APPLICATION-DEPENDENT DATA             ...
+-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|T |        NOT USED           |            INTERVAL            |
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       SEQUENCE NUMBER         |
+-+-+-+-+-+-+-+-+-+-+-+-+-+-+-+-+-+-+-+-+-+-+-+-+-+-+-+-+-+-+-+-+
|                           TIMESTAMP                           |
+-+-+-+-+-+-+-+-+-+-+-+-+-+-+-+-+-+-+-+-+-+-+-+-+-+-+-+-+-+-+-+-+
|           SYNCHRONIZATION SOURCE (SSRC) IDENTIFIER            |
+=+=+=+=+=+=+=+=+=+=+=+=+=+=+=+=+=+=+=+=+=+=+=+=+=+=+=+=+=+=+=+=+
|             CONTRIBUTING SOURCE (CSRC) IDENTIFIERS            |
|                              ....                             |
+-+-+-+-+-+-+-+-+-+-+-+-+-+-+-+-+-+-+-+-+-+-+-+-+-+-+-+-+-+-+-+-+
```

FIG. 8

DATA PROCESSING SYSTEM AND METHOD FOR PACING INFORMATION TRANSFERS IN A COMMUNICATIONS NETWORK

TECHNICAL FIELD

The present invention relates in general to communication networks, and in particular, to protocols and techniques to improve the flow of information within the communication network.

BACKGROUND INFORMATION

Data networks for transferring electronic information are becoming increasingly widespread for the communication of many different types of data including text, graphics, voice, and video data used with a computer. Such networks enable the interconnection of large numbers of computer workstations, telephone and television systems, video teleconferencing systems and other facilities over common data links or carriers. Computer systems are typically interconnected by local area networks (LAN) such as Ethernet, Token Ring, DECNet, and RS-232 networks. Metropolitan, national and international network systems for computers are interconnected by wide area networks (WAN) such as T1, V3.5 and FDDI.

With the advent of LANs and WANs, use of networks of various types to connect computer systems continues to increase. As the network is required to communicate a significant amount of information, performance of the network is often evaluated and many techniques have been developed and used to enhance data flow within such networks.

The precise data transmission techniques used within computer system networks depends on both the hardware and systems architecture of the network. The International Organization for Standardization (ISO) has promulgated an Open Systems Interconnection (OSI) communications model for use with data communications between computer systems and has been incorporated in many network architectures. The OSI model has several different layers which include a physical layer, a data link layer, a network layer, a transport layer, a session layer, a presentation layer and an application layer. Other structured architectures, such as a Systems Network Architecture (SNA), have a similar organization, although the various layers may not be exact equivalents of the OSI model.

Protocols between communicating computer systems are often implemented at multiple layers of the structured model. For example, the physical layer uses various signalling protocols, and the data link layer insures that individual data packets are not corrupted during transmission between two directly connected systems. At the same time, the network and transport layers insure that data packets arrive at the correct systems within a network and in a correct order. Higher layers also talk to one another using various preselected protocols. Such protocols are well-known in the data processing art and will not be described in greater detail herein. Additionally, there is also class of protocols which do not correct corrupted packets and do not ensure that the data packets arrive in a correct order. Such protocols may include a DataGram service, referred to as UDP/IP (User Datagram Protocol/Internet Protocol).

A technique which has been used to control data flow over networks at the session level is referred to as session level pacing. This technique has been used in structured architectures, such as systems network architecture (SNA). With this technique, a receiving logical unit controls when a sending logical unit may send a window of data packets. It should be noted that a "window" represents the total number of data values in transit through the network at any time. This methodology utilizes explicit acknowledgment signals sent from a receiving logical unit to indicate that a window of data was received without error. This acknowledgment signal is then used to advance the window to admit a new set of data values. In the static pacing technique described above, the window size is fixed when the communication session between sending and receiving logical units is initialized. Only the timing of the window transmission is controllable in this static pacing technique.

An adaptive pacing technique has also been used to allow a window size to be adjusted dynamically during the communication session. In an adaptive pacing technique, the receiving logical unit controls a size of each window in order to optimize use of its own resources. This adaptive pacing technique is described in detail in U.S. Pat. No. 4,736,369, issued to Barzilai, et al., which is hereby incorporated by reference herein.

Although adaptive pacing allows more efficient use of both the communications link and receiving logical unit resources, problems may arise at the sending logical unit. For example, even the adaptive pacing technique requires that the sending logic unit keep a free window of data available until the receiving logic unit transmits an acknowledgment for the window and the sending logic unit receives the acknowledgment. Therefore, while the sending logic unit is waiting to receive affirmation that the receiving logic unit has in fact received the window of data, the sending logic unit is unable to send any additional data and valuable unit bandwidth is wasted. Additionally, because the sending logic unit is required to wait a certain number of timing cycles until an acknowledgment is received, real-time transfers of data are not easily implemented. When such real-time operations are transmitted, a resulting display at the receiving logic unit fails to provide a true transmission of the desired information.

Therefore, it is desirable to implement a system which transfers data to communicate information in a network in a real-time manner.

SUMMARY OF THE INVENTION

The previously mentioned needs are fulfilled with the present invention. Accordingly, there is provided, in a first form, a communication network. The communication network includes a server for transmitting a plurality of information values at a first rate until a pacing message is received by the server. The communication network also includes a client computer system connected to the server for decoding the plurality of information values at a second rate and for providing the pacing message.

Additionally, there is provided, in a second form, a method for operating a server while the server is communicating a plurality of information values with the client computer system. This method includes the steps of enabling a server to transmit the plurality of information values at a first rate, receiving a transmission variable value from the client computer system at an input circuit of the server, comparing the transmission variable value with a pacing coordination variable value stored in a memory of the server, and initiating a pacing operation in which the server withholds communicating the plurality of information values for a time.

Furthermore, there is provided, in a third form, a method for operating a client computer system while a server is communicating a plurality of information values with the client computer system. This method includes the steps of:

i. receiving the plurality of information values from the server;

ii. storing the plurality of information values in a buffer pool of the client computer system;

iii. determining a first number of data values stored in the buffer pool of the client computer system;

iv. repeating steps i. through iii. when the first number of data values stored in the buffer pool is below a buffer threshold level;

v. transmitting a pacing message to the server when the first number of data values stored in the buffer pool is above the buffer threshold level.

These and other features, and advantages, will be more clearly understood from the following detailed description taken in conjunction with the accompanying drawings. It is important to note the drawings are not intended to represent the only form of the present invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates, in block form, a real-time control packet format such as that used in one embodiment of the present invention;

FIG. 7 illustrates, in block form, a portion of the packet format of FIG. 6; and FIG. 8 illustrates, in block form, a header value for a protocol used to implement one embodiment of the present invention.

DETAILED DESCRIPTION

Figure 1:
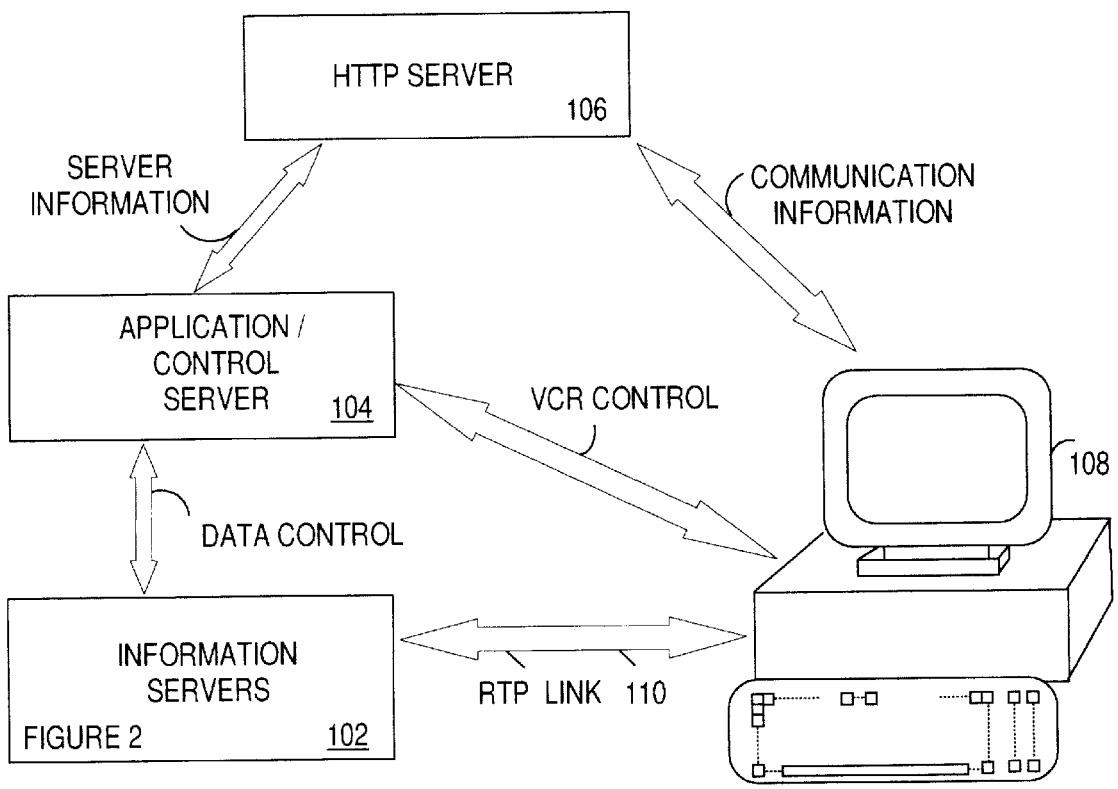
FIG. 1 illustrates, in block diagram form, a communication network in accordance with one embodiment of the present invention.

The present invention implements a unique push, or streaming, model for communicating time sensitive encoded data, such as video and audio data, in a communication network. In a push model for communicating information in the computer network, a server is implemented to send data at an effective encoded bit rate. Furthermore, there is no frame level retransmission recovery for errors such as that implemented in prior art implementations which required an acknowledge signal to initiate subsequent data transfers. Although the implementation of the present invention and the use of this push model for communicating data will be subsequently described in greater detail, the benefits of the push mode of operation and communication will be provided herein.

Chief among the benefits of a server push model for data communication is server efficiency. When the push model of data communications is implemented, the transmission of real-time data is scheduled at a relatively fixed rate and this greatly reduces state machine requirements of the server. Stated another way, such scheduled operation creates a smooth flow of information into the network and greatly reduces the variance of delay in the sending of data. Additionally, because of this smooth flow to the computer network, the utilization of the physical link to the network can be set higher without a significant impact on server queuing and variance of delay of the transferred data values. Furthermore, without retransmission error recovery, the state machine and buffer management complexities of the server are greatly reduced from those of the prior art implementations previously discussed in the Background of the Invention.

In addition to server efficiency, the efficiency of the computer network is also increased. Because push mode operation facilitates a smooth transfer of real-time data into the network, the delay variance resulting from the computer network can be controlled and the end-to-end variance of the delay may be bounded. As well, internal physical links within the computer network can be driven to higher levels of utilization for this real-time data. Such higher level of utilization are realized because most communication networks which use packetized information manage bursty traffic with buffering and extra resources, such as added bandwidth. The buffering implemented by communication networks precludes data loss as traffic bursts occur. As buffering resources are limited, bursts of traffic which are too long and result from too many inputs will cause data to be discarded as the buffer overflows. Spare capacity on communication network links provide capability to forward the burst temporarily accumulated in the buffers. Thus, as bursts of traffic arrive and are buffered because the aggregate exceeds an output rate of a communication network link, the average spare link capacity will tend to maintain the buffer utilization at an acceptable level to prevent buffer overflow. The amount of buffering will vary as bursts of traffic come and go, thus causing variance of delay of the packets through a communications node. Removing bursts of traffic by smoothing data into the network reduces the buffers used, allows the link utilization to be increased and reduces the network induced variance of delay.

In addition to server and network efficiency, the present invention may be easily implemented by the receiver, or client, without the need for a substantial amount of memory. Because the push model provides information at a known and effective encoded bit rate, the need to have memory to store a complete file (which can be very large for video) is eliminated. Rather, the presentation of the video or audio application begins shortly after a data stream corresponding to such video or audio operation has been received by the client. This greatly reduces the presentation latency as the complete file does not need to be transferred before a video or audio application may be executed. Again, as there is no retransmission error recovery, the state machine requirements for implementing the client portion of the communications network are reduced.

In prior art push model implementation, a receiver decode mechanism would track a transmission clock of a sending server, a buffer overflow or under-run would occur in the receiving client. This tracking mechanism compensates for the skew of the server transmitting clock to the receiving (decode) presentation clock. Such tracking would prevent the receiving side from under-running or overflowing its receive buffering which feeds a decode process. However, many decoders have not been designed to perform this tracking. Additionally, the capability of tracking is made more complex by variance of delay of the packets from the server, through the network, and within the receiving client. The present invention implements an effective push model of operation which does not require a strict tracking operation as may have been used by the prior art implementations previously discussed.

To implement the present invention, a pacing mechanism is required for a client or receiver to pace a streaming, or push mode, server. It should be noted that in a subsequent description of operation, the terms "client" and "receiver" will be used interchangeably. Similarly, the terms "streaming" and "push mode" will also be used interchangeably. The pacing mechanism of the present invention allows the client to pace a streaming server in a stable way such that a fill level of a client buffer will oscillate around a single threshold value. This stable operation may be accomplished while the streaming server is fundamentally still functioning in a push mode. The present invention also implements a simple protocol to be used to protect pacing primitives, allow recovery for pacing primitives, and to keep a client and a server synchronized during the pacing operation. The mechanism used to implement the present invention will subsequently be described in greater detail.

The present invention implements a pacing mechanism for insuring that data is transmitted from a server to a client in an effective and accurate manner to implement real-time operations in a communications network. To implement this pacing mechanism, the streaming server transmits data at a slightly faster rate than it was encoded. Subsequently, a decoder circuit on the client, or receiver, uses the transmitted data at an encoded rate. Therefore, the client uses the transmitted data at a slightly lower rate than the data is being received. Thus, the utilization of buffers in the client will gradually increase. When the utilization of the buffers reaches a threshold level, the client provides a Pace Message to the server. When the Pace Message is received, the server withholds sending data for a period of time sufficient to drop the client buffer utilization to a level below a threshold level. Through the use of this method, the streaming server of the present invention will effectively track a rate of decoding performed by the client, while fundamentally continuing to operate as a streaming server.

During operation, the buffer circuits in the client device are initially loaded to a sufficient level so that an initial beginning of the decode process, when combined with the variance of delay associated with the communications network, will not cause an under-flow to occur during initial operation periods. Furthermore, as the server is sending data at a slightly faster rate than the decode rate of the client, the client buffer will gradually increase. When a fill level associated with the client buffer rises above a threshold mark, the client device initiates pacing to the server device. This pacing operation is accomplished by the client device sending the server device a pacing primitive which contains a number of transmission time periods the server should wait in sending data to the client. In implementing this methodology, no data is lost or skipped, but only delayed in the server by the specified time periods. A number of periods to wait is determined by the client such that additional pacing will not be required until after the requested pacing is accomplished and a guardband time period has expired. Such a guardband time period is needed to take into account data rate, round trip delay, and recovery for lost Pace Messages.

During operation of the present invention, the buffer fill level of the client oscillates around the threshold level, and as such, is very stable. This buffer fill level is sensitive to decoders causing the buffer fill level to naturally oscillate. Furthermore, the buffer fill level is a peak of the oscillation caused by the decoder and triggers the pacing operation. Additionally, the oscillation peak will occur as a new packet of information is stored in the client buffer. As such, the client buffer fill level need only be checked against the threshold when a new packet of data is added to the buffer.

In a general implementation of the present invention, a number of time periods to wait may be sent in a field of backchannel (client to server) Pace Message. Furthermore, the value of the time periods to wait could be dynamically calculated based on buffer status, bit rate, packet size, and average rate of buffer utilization. The value of the time periods to wait could also be changed based on increased buffer utilization after an initial Pace Message and before a recovery retransmission of the Pace Message. Alternatively, the value of the time periods to wait could be defaulted or negotiated as part of the video and/or audio channel set-up. In this later case, the value of the time periods to wait would not need be sent in the Pace Message from the client device to the server device.

Furthermore, in the present invention, the client might send the Pace Message to the server immediately after the client threshold level is crossed. The client could also set a state within a state machine of the client to forward the Pace Message in another process. An example of this latter example is the use of a periodic Receiver Report Packet (RRP) specified by the IETF (Internet Engineering Task Force) in "RFC 1889," which defines a RTP (Real Time Protocol) for streaming real-time data over the Internet or another communication network. In this instance, the Pace Message would be embedded in the RTP receiver report.

In one embodiment of the pacing mechanism of the present invention, there is recovery for lost pace packets, and the server and the client remain synchronized on pacing status. Stated another way, the server is not able to interpret a recovery Pace Message as a new message and thereby the exposure of pacing multiple times on a single client request is not possible.

The recovery mechanism of the present invention assumes the availability of one bit in a minimal backchannel signal from the client device to the server device. This backchannel signal could be the RTCP (RTP Control Protocol) channel used in the IETF RTP protocol. Additionally, the mechanism of the present invention requires a single bit in the header information of the data packet sent from the server to the client. It should be noted that the receiver report packet (RRP) referred to above is a certain type of RTCP. Additionally, it should be noted that application specific function can also be carried in the RTCP. For example, the implementation of the client to server pacing of the present invention performs an application specific RTCP packet, as will be subsequently discussed in greater detail.

A system for implementing one embodiment of the present invention is provided in FIGS. 1–8. Before describing operation of the components illustrated in each of these Figures, the connectivity among each of these components will be described.

Description of Connectivity

FIG. 1 illustrates a communication system 100. Communication system 100 comprises information server 102, an application/control server 104, an HTTP server 106, and a client (receiver) 108. Information server 102 is coupled to client 108 via an RTP link 110. Information server 102 is coupled to application/control server 104 via a data control bus. Application/control server 104 is coupled to HTTP server 106 via a server information bus. The three illustrated server functions, 102, 104, and 106, may be implemented in separate physical entities with physical communication links forming their interconnection. Alternatively, various combinations of these functions can be implemented in a single physical server system. Additionally, the illustrated links to client 108 are logical in nature, with a client 108 coupled to a communication network from a single adapter and having a multiple logical connections to the server functions, 102, 104, and 106, via the communications facilities. A HTTP server 106 is coupled to client 108 via a communication information bus. It should be noted that HTTP server 106 provides navigation and selection functions in the present implementation of the invention. Furthermore, an application/control server 104 provides for VCR control functions via a VCR Control connection.

Figure 2:
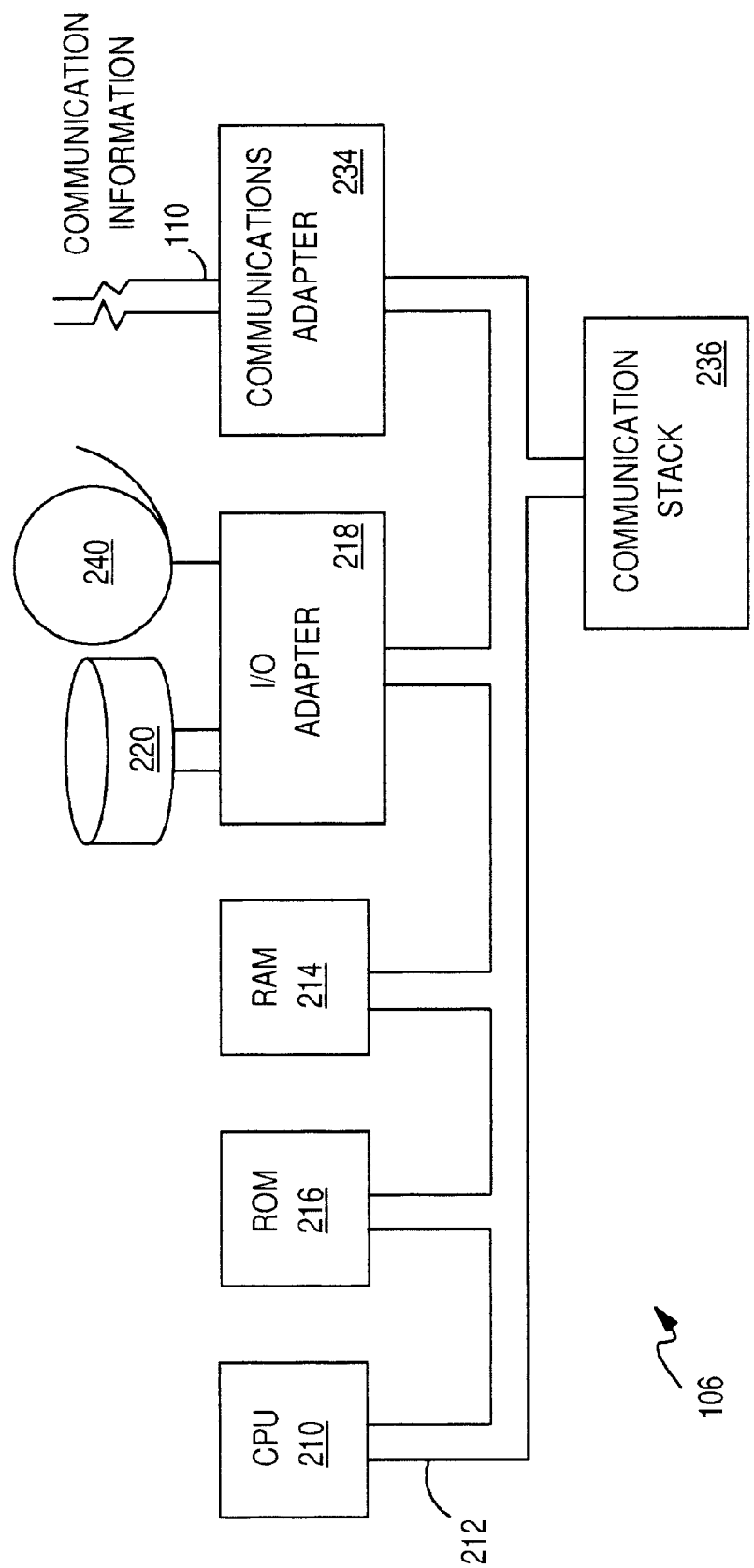
FIG. 2 illustrates, in block diagram form, a server of FIG. 1.

FIG. 2 illustrates an information server 102. Server 102 comprises a CPU 210, a ROM 216, a RAM 214, an I/O adapter 218, a disk storage device 220, a storage device 240, a communications stack 236, and a communications adapter 234. Each of CPU 210, ROM 216, RAM 214, I/O adapter 218, communications adapter 234, and a communications stack 236 is coupled via an information bus 212. I/O adapter 218 is coupled to disk storage device 220 and storage device 240. Communications adapter 234 is coupled to a communications network providing information to client 108 using RTP link 110.

Figure 3:
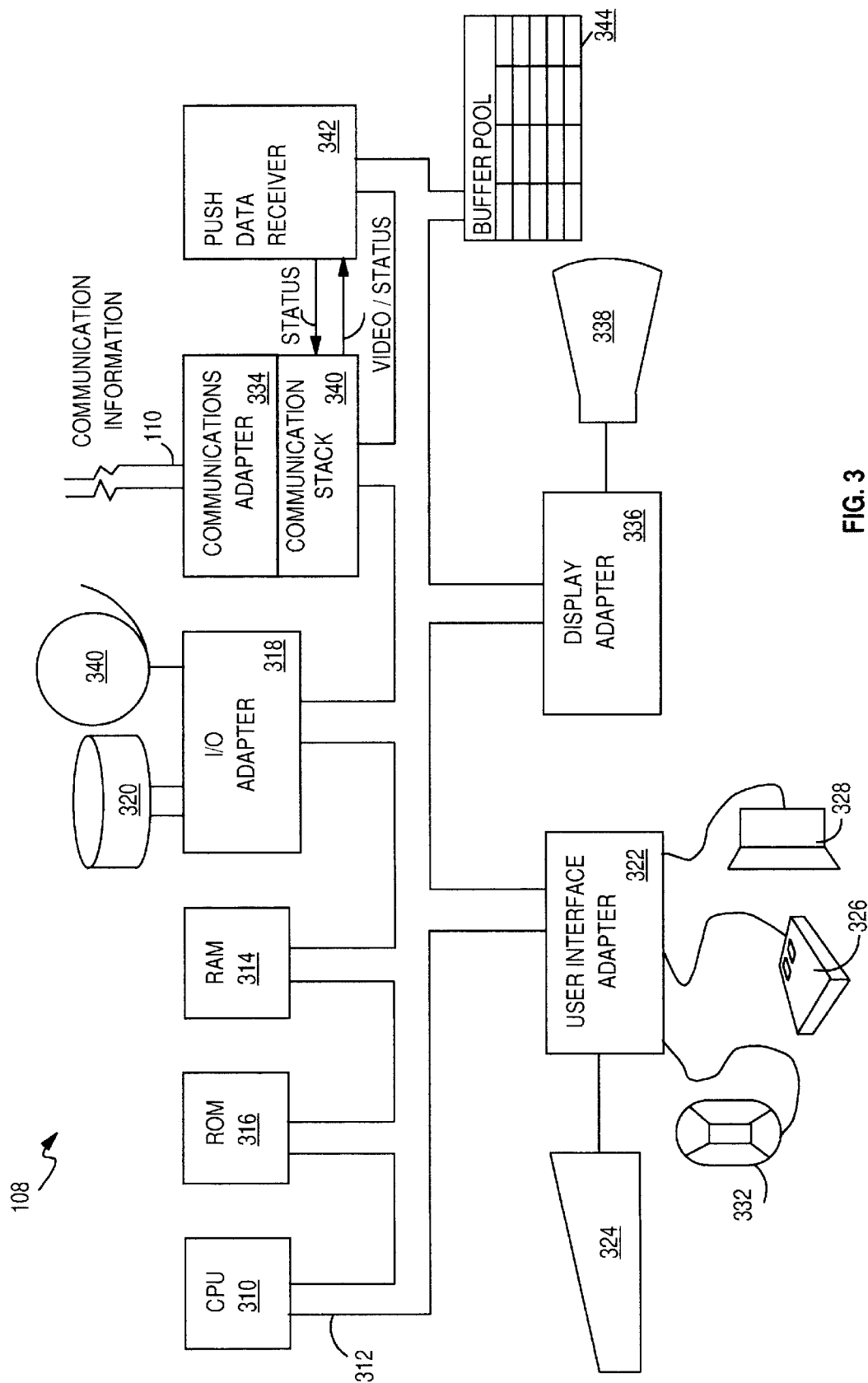
FIG. 3 illustrates, in block diagram form, a client/receiver of FIG. 1.

FIG. 3 illustrates client 108 in greater detail. Client 108 comprises a CPU 310, a ROM 316, a RAM 314, an I/O adapter 318, a disk storage device 320, a storage device 340, a keyboard 324, a trackball 332, a mouse 326, a speaker 328, a user interface adapter 322, a display adapter 336, a display 338, a buffer pool 344, a communications adapter 334, a communication stack 340, and a push data receiver 342. Each of CPU 310, ROM 316, a RAM 314, I/O adapter 318, communication stack 340, communications adapter 334, push data receiver 342, buffer pool 344, display adapter 336, and user interface adapter 322 are coupled to one another via an information bus 312. Each of keyboard 324, trackball 332, mouse 326 and speaker 328 are coupled to user interface adapter 322. Similarly, display 388 is coupled to display adapter 336. Disk storage device 320 and storage device 340 are coupled to I/O adapter 318. Push data receiver 342 is coupled to communication stack 340 via a status signal and a video/status signal. Communications adapter 334 is coupled to a communications network providing information to all server functions, including information servers 102, using RTP link 110.

It should be noted that the data processing systems illustrated in FIGS. 2 and 3 are provided by way of example, and it should be well-known to those with skill in the art that additional configurations of these systems may be provided. Given that the illustrates provided in FIGS. 2 and 3 are exemplary, it should be noted that CPU 210 and CPU 310 may be implemented as a PowerPC microprocessor ("PowerPC" is a trademark of IBM Corporation) according to "The PowerPC Architecture: A Specification for A New Family of Risk Processors", 2nd Ed., 1994, Cathy May, et al., ed., which is incorporated herein by reference. A more specific implementation of a PowerPC microprocessor is described in the "PowerPC 604 Risk Microprocessors User's Manual", 1994, IBM Corporation, which is hereby incorporated herein by reference. Additionally, it should be well understood that other data processing systems may be used to implement client 108 of the present invention.

Both ROM 216 and ROM 316 include a basic input/output system (BIOS) that controls certain basic functions of a corresponding one of the systems in which they are implemented. Additionally, it should be noted that I/O adapters 218 and 318 may be implemented as a small computer system interface ("SCSI") adapter that communicates with a corresponding one of disk storage device 220 and 320. Communications adapter 234 and communications adapter 334 interconnect an internal information bus (212 and 312) with an outside network to enable the system to communicate with other such systems. Furthermore, as illustrated in FIG. 3, a user may be capable of inputting to the system through keyboard 324, trackball 332, or mouse 326 and receiving output from the system via speaker 328 and display 338. Additionally, an operating system such as AIX ("AIX" is a trademark of the IBM Corporation), OS/2, or Windows '95 by Microsoft is used to coordinate the functions of the various components illustrated in FIGS. 2 and 3.

Preferred implementations of these sections of the present invention include implementations as the computer system programmed to execute the method or methods described herein, and as a computer program product. According to the computer system implementation, sets of instructions for executing the method or methods are resident in a corresponding RAM (214 and 314) of one or more of the data processing systems configured generally as above. Until required by the communication system, the set of instructions may be stored as a computer program product in another computer memory, such as disk storage device 220 or disk storage device 320, each of which may include a removable memory such as an optical disk or a floppy disk for eventual use in the corresponding disk drive. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these in similar terms should be associated with the appropriate physical elements.

Note that the invention describes terms such as comparing, validating, or other terms that could be associated with the human operator. However, for at least a number of operations described herein which form part of the present invention, no action by a human operator is desirable. The operations described are, in large part, machine operation processing electrical signals to generate other electrical signals.

Now that a description of connectivity for the present invention has been provided, a description of operation will subsequently be explained.

Description of Operation

FIG. 1 illustrates a communication system in which client 108 is able to retrieve information from a plurality of information servers 102 via certain protocols. The information provided by information server 102 may be video, audio, or any data desired by client 108. In particular, when the present invention is utilized, client 108 is able to receive real-time information, whether video or audio, from information server 102. During operation of communication system 100, client 108 may access certain information. For example, the navigation and selection of a specific video or videos is provided by use of a client web browser implemented within client 108. HTTP server 106 obtains information about a title of a desired video from application/control server 104 for display at client 108 via the client's web browser. When client 108 makes a selection of a video, HTTP server 106 obtains information relevant for the video from application/control server 104. This information is then forwarded to client 108. Subsequently, during operation, application/control server 104 serves as an interface for client 108 to control the play (VCR functions) of the requested video. In performing this operation, application/control server 104 provides the VCR control interface from client 108 to an appropriate video server 102. The video is then sent from video server 102 to client 108 using the IETF RTP protocol previously described. It should be noted that other system level implementations could be used to implement the present invention.

The present invention implements a unique communication protocol between information server 102 and client 108. The protocol will first be described with respect to information server 102. Refer to FIG. 2 for a more detailed illustration of information server 102. The protocol implemented by the present invention is performed under control of CPU 210 of information server 102. CPU 210 of information server 102 provides control information for accessing digital encoded data from a storage device such as disk storage device 220, storage device 240, ROM 216, and RAM 214. The digital encoded data will typically be video or audio data as the protocol implemented by the present invention is particularly useful for real-time applications. A clock within information server 102 (not illustrated herein) is used to establish a rate at which the digital encoded data will be sent to client 108. It should be noted that the clock is set to send data packets at an effective rate which is slightly higher than the encoded bit rate. The setting of the clock is performed in a development stage of information server 102 in one embodiment of the present invention. Therefore, the actual rate can be determined by information server 102 in a fixed fashion, such as a fixed percentage above an encoded bit rate, or an actual rate of data transferred could be set by a client 108 during a set-up phase of operation which allows client 108 to calculate a clock rate based on various perimeters in the client. The clock rate should be selected so that it is greater than a worst case server-client clock skew, wherein a clock skew indicates a mismatch of clocks. An upper bound of the clock rate should be set such that the pacing operation can take place along with recovery of a number of lost Pace Messages prior to the need to send a subsequent Pace Message. Furthermore, the upper bound should be selected so that the upper bound of buffering is not exceed during a pacing recovery operation. Thus, generally a small margin above a minimum clock skew is appropriate. In one embodiment of the present invention, a 3% margin was implemented. However, client 108 is able to calculate a rate depending on its needs and may, subsequently, send this information to information server 102.

After data has been retrieved from memory within information server 102, CPU 210 configures the data into packets of information, applies appropriate headers for transferring the packets of information, sets status bits in the header, and subsequently sends the packet to communication stack 236 to be sent to client 108. From communication stack 236, the data packets are provided to communications adapter 234 which outputs the information to client 108 via RTP link 110.

A method for sending data from information server 102 to client 108 has previously been described. When information server 102 receives information, a status message encoded in the information is received by communications adapter 234. The status message is subsequently stored in communications stack 236 where it is accessed by CPU 210. When CPU 210 receives the status message from communication stack 236, CPU 210 determines if this is a Pace Message from client 108. If a new Pace Message is received and CPU 210 is not currently in a Wait period, then CPU 210 initiates a Wait period which suppresses sending packets of data for the required time set forth in the Wait interval in the received information of the Pace Message. If CPU 210 is in a Wait period when a Pace Message is received, the Pace Message is discarded. Additionally, if the Pace Message is determined to be a retransmitted Pace Message for an expired Wait interval, the Pace Message is discarded. Subsequently, when a Wait period required time has passed and CPU 210 resumes packet transmission, CPU 210 generates the appropriate header information to indicate that data packet transfers have been resumed from a previous pace request of client 108. It should be well-known to those with skill in the art that a timing function may be implemented using a timer (not illustrated herein) implemented in information server 102. Mechanisms for determining a new Pace Message and the indication of resumed data packets will subsequently be described in greater detail.

In client 108, data packets are received by communications adapter 334 via Communication Information bus 110. The data packets are subsequently stored on a communication stack 340. Push data receiver 342 receives the data packet, including header status information, from communication stack 340 via a Video/Status signal. Push data receiver 342 subsequently provides data into buffer pool 344, where it is stored in a FIFO-type structure. Furthermore, while push data receiver 342 stores the data to buffer pool 344, push data receiver 342 receives threshold information from buffer pool 344. In one embodiment of the present invention, this threshold information is used by CPU 310 to determine whether a certain threshold level has been met. It should be understood by those with skill in the relevant art that the determination that a specific threshold has been met may also be performed by communication adapter 334 or decode circuitry (not illustrated herein). As previously mentioned, this threshold level may be fixed by a developer of client 108 or programmed therein by a programmer of client 108.

Subsequently, CPU 310 retrieves data from the plurality of buffers of buffer pool 344 and decodes the information to determine an appropriate interface to which it should be provided. For example, if the data information is video information, CPU 310 decodes the information and provides the decoded information to display adapter 336. Display adapter 336 subsequently provides the data to display 338 where it is displayed in a real-time manner to an external user. Similarly, if the data is real-time audio data, CPU 310 decodes the audio data and provides the decoded information to user interface adapter 322. User interface adapter 322 subsequently provides the real-time audio signals to speaker 328, where the audio information is output to the external user. In each of the decode operations described above, it is assumed that a software decode operation is being performed. However, it should be understood to those with skill in the relevant data processing art that hardware or hardware assisted decode processes may also be implemented in alternate embodiments of the present invention. Furthermore, when CPU 310 completes the decode process of the buffer of data, the buffers are released to the buffer pool for reuse.

As CPU 310 accesses information from the plurality of buffers in buffer pool 344, used buffers are released to the plurality of buffers in buffer pool 344 for reuse. As each new packet of data is received by push data receiver 342, push data receiver 342 compares the utilization of buffer pool 344 with a threshold level thereof. If the threshold level of buffer pool 344 is exceeded and a pacing operation is not currently in progress, CPU 310 calculates a Wait period required to decrease an amount of data stored in buffer pool 344 below a threshold value by calculating a Wait interval. The Wait interval is calculated to move the buffer utilization below the threshold level such that the time for the buffer utilization to reach the threshold level again will be fairly long. With a server rate of 3% faster than the encoded bit rate and with a buffer pool 344 capacity of ten seconds of real time data, a Wait period of one second or less would be reasonable in one embodiment of the present invention. In such a case, 1 second of a Wait period would reduce the buffer utilization by 10% of the buffer pool, and it would be approximately 33 seconds between new Pace Messages. These parameters are given as examples, and may be tuned differently to meet various application requirements. Furthermore, CPU 310 configures a Pace Message with a Wait interval to be sent to information server 102 via communication stack 340 and communications adapter 344. If the buffer threshold is exceeded and a pacing operation is already in progress, push data receiver 342 may modify a buffer threshold level in a pace level variable. The pace level variable tracks the high points of utilization, while a pacing operation is in progress. The pace level variable is only modified if the utilization, as another buffer is used for receiving data, is greater than the existing value in this variable.

Furthermore, once a pacing operation is initiated, push data receiver 342 sets a "time out" for retransmission of the Pace Message. When such time out occurs, push data receiver 342 sends another Pace Message to information server 102 with a Wait interval value. Optionally, the Wait interval calculation may be based on the pace level variable discussed above. Thus, during recovery, the newly calculated wait time could reflect the higher level of utilization of buffer pool 344 above the set threshold.

Subsequently, when push data receiver 342 receives a data packet of information having a RTP header which indicates that pacing has taking place, the time out set therein is reset.

It should be noted that a protocol for the headers may be implemented as the previously referred to RTP (real time protocol) defined by the IETF (Internet Engineering Task Force). An example of an RTP header which may be used to implement the present invention is illustrated in FIG. 8. In the RTP header, the "V" bit represents a RTP version, while a "P" indicates the presence of padding information. A "PT" value refers to a Packet/Payload Type . A "SSRC" value indicates a Synchronization Source identifier, and "X" value indicates a header extension value, and a "CC" value indicates a number of CSRC identifiers that follow a fixed header. Additionally, in the RTP format illustrated in FIG. 8, a "M" value indicates a marker function which is dependent upon a profile of the data transmitted. The Sequence Number is incremented by one for each data packet sent and can be used by a receiver to detect lost or out of sequence packets. Furthermore, the "Time Stamp" value is used for jitter calculation at a receiver and may also, potentially, be used for synchronization purposes.

In the RTP header illustrated in FIG. 8 and for profile in one embodiment of the present invention, the M-bit may be used to identify RTP data packets following Wait interval after a client has indicated that a Wait interval should be initiated in which information server 102 pauses in its transmission of data to client 108. The M-bit will subsequently be described in greater detail.

During operation, the M-bit is sent in each RTP data packet from information server 102, and its value is taken from the M-bit state maintained in information server 102. The M-bit state may also be used to identify a new Pace Message from client 108, which precludes information server 102 from entering another wait period based on a recovery Pace Message after the wait interval. Identifying a new Pace Message is accomplished by comparing the M-bit state to the T-bit received in the Pace Message from client 108. If these bits are different the Pace Message is accepted as a new Pace Message, otherwise it is discarded. The T-bit in the Pace Message from client 108 is subsequently described.

Information server 102, having accepted a new Pace Message, sets the wait period timer and enters the suspend state. While in the suspend state, information server 102 does not send data packets to client 108. Any subsequent pacing messages received while in suspend state are discarded. Upon expiration of the wait period timer, information server 102 changes the state of the M-bit state, which now makes it equal to the T-bit received in the aforementioned new Pace Message, and returns to sending data packets in the send state.

When using IETF RTP formats, FIGS. 6 and 7 illustrate the formats for the transmission of application data from client 108 to information server 102. As previously described, the formats illustrated in FIGS. 6 and 7 are consistent with the RTP formats defined by IETF. Using RTP, an RTCP (Real Time Control Packet) with application specific information can be sent from client 108 to information server 102. The RTCP packet is illustrated in FIG. 6, while the Application-dependent data field of this header is illustrated in FIG. 7. As illustrated therein, the packet type is encoded as application specific, the sub-type field is encoded as a Pace Message, and the length field indicates the length of the application-dependent field.

When client 108 determines that a pacing operation should be performed, the application-dependent data portion of the format set forth in FIG. 6 is configured as illustrated in FIG. 7 by CPU 310. In FIG. 7, the "Wait interval" is defined to be a number of data packets, or times associated with transmission of the data packets for server 102 to wait before sending a next data packet. As previously mentioned, when client 108 is receiving data in a receive state, and a threshold level of buffer pool 344 is exceeded and detected by push data receiver 342, CPU 310 generates a Pace Message to be sent to information server 102. This Pace Message is illustrated in FIGS. 6 and 7. When a Pace Message is sent to server 102, the T-bit is toggled to a next logic state and the Wait interval value is set to a number of packets necessary to bring client buffer utilization down below the threshold by a fixed amount. When a Pace Message is sent, client 108 enters a pacing state from a receive state. Additionally, a timer (not illustrated) is set to periodically retransmit a Pace Message, if the pacing had not been accomplished as indicated by the compare of an incoming data packet M-bit to a last sent T-bit.

In one embodiment of the present invention, when a data packet is received and the M-bit matches the T-bit, then the aforementioned Pace retransmission timer is cancelled and the pacing state returns to the receive state.

While client 108 is in the pacing state, client 108 is still able to receive RTP data packets from information server 102, where the M-bit of the RTP header sent therewith has not been changed to the T-bit state of the Pace Message. These received data packets are put into buffer pool 344, as previously described. Additionally, the M-bit of the RTP header (of FIG. 8) is used to identify RTP data packets sent by information server 102 after a Wait period has expired. This identification is performed when CPU 210 of information server 102 sets the M-bit in the RTP header to a T-bit state of the Pace Message sent by client 108. This modification of the M-bit is performed prior to the sending of the first RTP data packet after the Wait period and is used by client 108 to identify that the Wait interval for a prior request has been completed.

When client 108 is in the pacing state when client 108 is in the pacing state and a Pace Time Out (TO) occurs, client 108 initiates another Pace Message without a T-bit modification and with the new interval based on a maximum buffer utilization (indicated in the pace level variable). When a data packet is received by client 108 and the M-bit of the RTP header matches the T-bit state, client 108 forwards the data to buffer pool 344, resets the Pace Time Out, and returns to a receive state.

Operation of the communication system 100 of the present invention has been described above. However, to further clarify operation of each of information server 102 and client 108, state diagrams for each will subsequently be described. In that description, it should be noted that the state and transition variables used in each may be defined as follows:

Ss—C/S Pacing Coordination State Variable in the information server 102

Ts—Transmission Variable sent from information server 102 to client 108 in a header of each data packet: this bit reflects the state of Ss.

Sc—C/S Pacing Coordination—State Variable in the client 108

Tc—Transmission Variable sent from client 108 to information server 102 in a back channel packet. This bit reflects the state of Sc.

Initially, all state variables are set to "0" during operation of one embodiment of the present invention. With each data packet sent from information server 102 to client 108, the Ts bit in a packet header is set to Ss. With each "pacing" message sent from client 108 to information server 102, the Tc bit in the client message is set to Sc. When pacing is not in progress, Ss and Sc will be equal, and therefore Tc will be equal to Ss and Ts will be equal to Sc.

Figure 4:
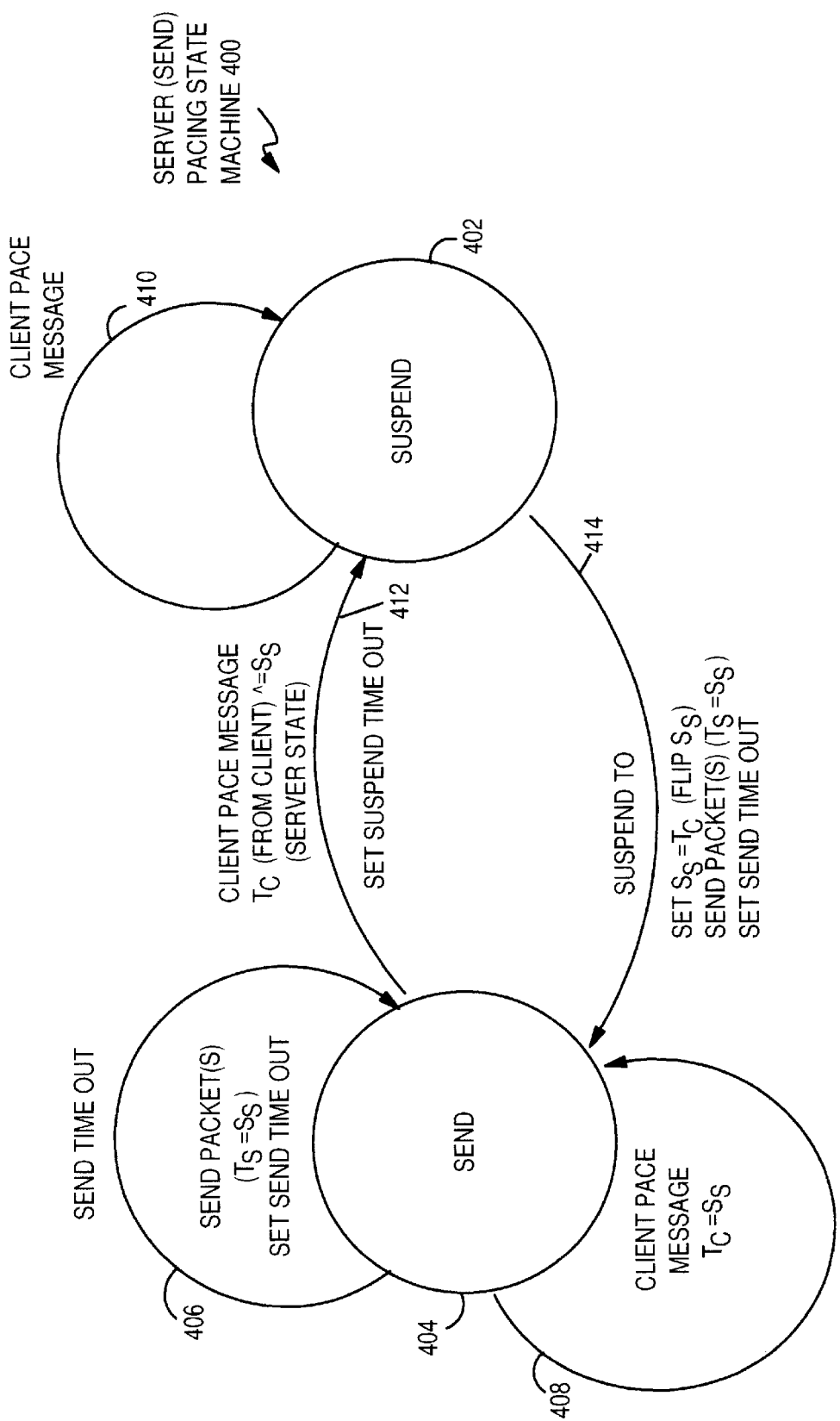
FIG. 4 illustrates, in state diagram form, a server pacing state machine.
Figure 5:
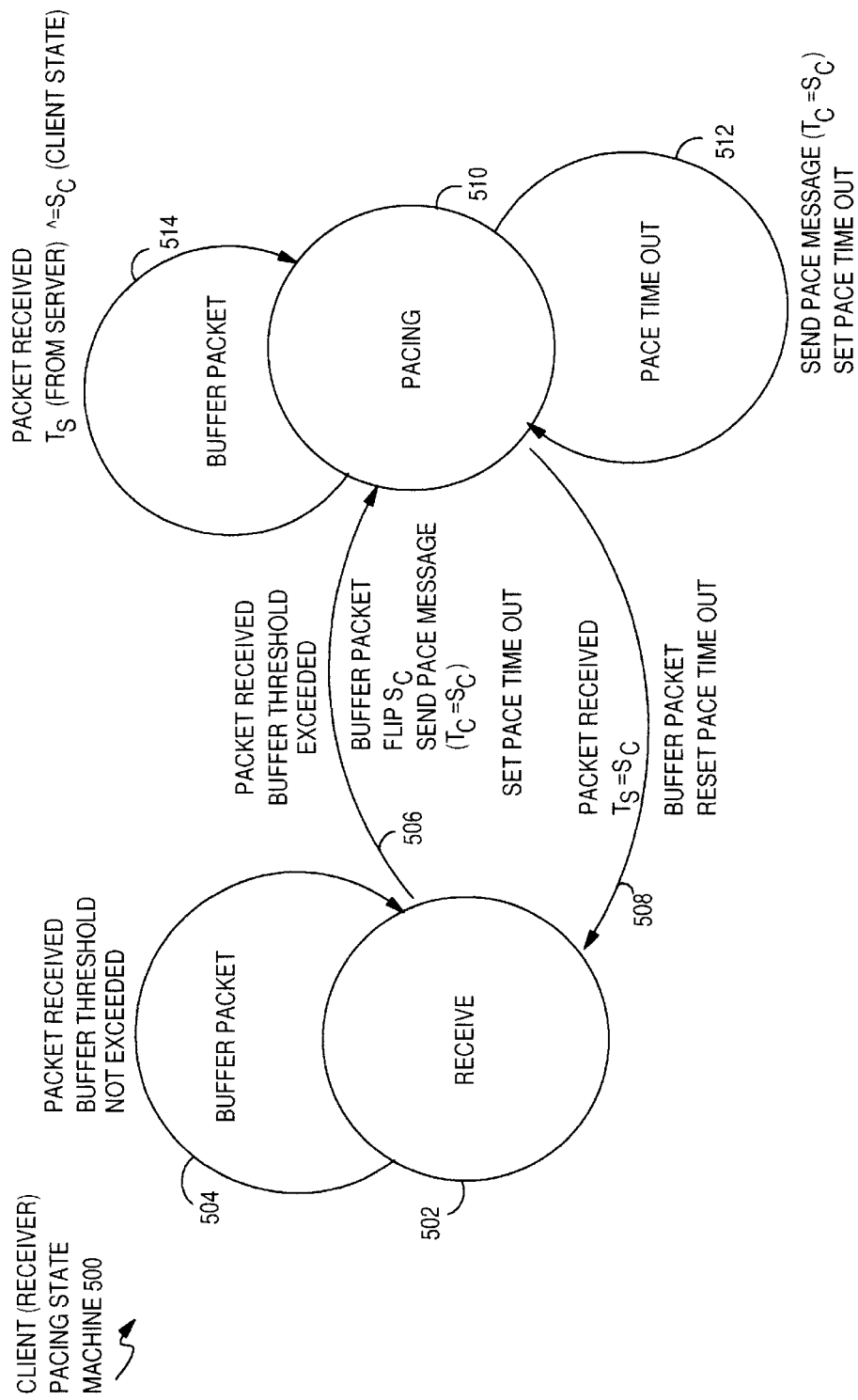
FIG. 5 illustrates, in state diagram form, a client pacing state machine.

FIGS. 4 and 5 illustrate state machines corresponding to the server and the client, respectively. The basic operation of each will subsequently be described. To initiate pacing, client 108 modifies the state of Sc, sends the Pace Message to server 102 (with Tc=Sc), and enters the Pacing state. Information server 102 detects a Tc value different from Ss, pacing is initiated in server 102. During a pacing operation, information server 102 stops sending packets for a time period indicated, or for pre-established time periods. When pacing has completed at information server 102, information server 102 flips the state of the Ss value. When client 108 detects that Ts is equal to Sc, client 108 changes state to the Receive state.

FIG. 4 illustrates a server pacing state machine 400 corresponding to information server 102 of the present invention. While in a Send state, information server 102 periodically sends data to client 108 with the Ts bit set to equal the Ss state. This is indicated by line 406. While in that Send state, information server 102 compares the Tc bit with the state of its Ss bit when a message containing a Tc bit from client 108 is received. If the Tc bit is equal to the Ss bit, no operation is performed. This is indicated by line 408 of FIG. 4. However, if the Tc bit is not equal to the Ss bit, information server 102 initiates pacing by 1) using the skip count, which was pre-established or optionally sent in the client pacing message from client 108, to withhold sending data packets for a prescribed time period, and 2) entering a Suspend state. This step is illustrated by line 412 of FIG. 4. While in the Suspend state, pacing messages from client 108 are ignored. This is illustrated by line 410 in FIG. 4. After completing pacing by withholding data for the prescribed time period, information server 102 modifies the state of its Ss variable, sends a data packet to client 108, with Tc=Ts, sets the Send Time Out, and returns to the Send state. This is illustrated by line 414 in FIG. 4. On all subsequent send periods, data packets are sent to client 108 with the header Ts value now set to the current state of its Ss variable.

FIG. 5 illustrates a state diagram corresponding to a client pacing state machine 500. While in the Receive state, data packets received by client 108 from information server 102 are stored in buffer pool 344. When a received packet is stored in buffer pool 344, the status of the buffer utilization is checked against the threshold level. If the utilization is below the threshold, no action is taken. This is indicated by line 504 in FIG. 5. If the buffer utilization is above the threshold, then the client 1) calculates the skip value, 2) changes the state of Sc, 3) send a Pace Message to information server 102 (with Tc set to Ts, and skip value) 4) sets Pace Time Out (for pacing retransmission) , and 5) enters the Pacing state. This is indicated by line 506 in FIG. 5. While client 108 is in the Pacing state, data packets received are put in buffer pool 344 and the Ts bit from the server is compared to the Sc state bit client 108. If the Ts bit is not equal to Sc bit, then client 108 remains in the Pacing state. This is shown by line 514 in FIG. 5. If the Ts bit from information server 102 is equal to the Sc bit of client 108, then client 108 resets the Pace Time Out and enters the Receive state. When the Pace Time Out is reached, client 108 sends another Pace Message to server 102 (with Tc set to Sc), reinitiates the Pace Time Out, and remains in the Pace state. This is illustrated by line 508 in FIG. 5.

By now it should be apparent that an apparatus and methodology for transferring information between a server and a client in a communication network has been provided. There are many additional configurations for implementing the invention described above. For example, the functions performed by client 138 could also be performed by a communication subsystem/communications adapter in an information server, such as server 102. Additionally, a communications adapter within client 108 could also be used to implement the present invention.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A communication network, comprising:

a server for transmitting a plurality of information values at a first rate until a pacing message is received by the server;

a client computer system coupled to the server for decoding the plurality of information values at a second rate and for providing the pacing message, said client computer system further comprising:

input means for receiving the plurality of information values at the first rate;

buffer means for storing the plurality of information values, the buffer means being coupled to the input means for receiving the plurality of information values;

decoder coupled to the buffer means for decoding each of the plurality of information values at the second rate; and central processing unit coupled to the buffer means for detecting when the buffer means stores a predetermined number of values and asserting the pacing message when the buffer means stores more than thee predetermined number of values.

2. The communication network of claim 1 wherein the second rate is less than the first rate.

3. The communication network of claim 1 wherein the first rate is a relatively fixed rate.

4. The communication network of claim 1 wherein the pacing message indicates an amount of time the server is to wait until resuming transmission of the plurality of information values.

5. The communication network of claim 4 wherein the amount of time is calculated by the client computer system.

6. The communication network of claim 1, wherein the server withholds transmitting the plurality of information values for a period of time required to remove a portion of a plurality of stored information values from the buffer means such that the buffer means stores less than the predetermined number of values.

7. The communication network of claim 1 wherein the client computer system and the server perform independently during the period of time required to remove the portion of the plurality of stored information values form the buffer means.

8. The communication network of claim 1 wherein the plurality of information values is video information.

9. The communication network of claim 1 wherein the pacing message is provided from the client computer system to the server using a receiver report packet of a real time protocol (RTP) standard.

10. The communication network of claim 1 wherein the server is placed in a wait state for a first time period when the pacing message is received by the server.

11. The communication network of claim 10 wherein the server remains in the wait state for the first time period when a subsequent pacing message is received by the server.

12. The communication network of claim 10 wherein the server ignores a subsequent pacing message when the first time period expires and the subsequent pacing message is a retransmitted pacing message.

13. The communication network of claim 1 wherein the client computer system detects when an operation executed in response to the pacing message is complete.

14. The communication network of claim 13 wherein the operation is a pacing operation.

15. A method for operating a server while the server is communicating a plurality of information values with a client computer system, comprising the steps of: enabling a server to transmit the plurality of information values at a first rate;

receiving a transmission variable value from the client computer system at an input circuit of the server;

comparing the transmission variable value with a pacing coordination variable value stored in a memory of the server; and initiating a pacing operation in which the server withholds communicating the plurality of information values for a time period.

16. The method of claim 15, wherein a step of initiating a pacing operation, further comprises the step of:

accessing a wait interval value to determine the time period in which the server withholds communicating the plurality of information values.

17. The method of claim 16 wherein the wait interval is provided to the server in a pacing message provided by the client computer system.

18. The method of claim 16 wherein the pacing message comprises the wait interval value and the transmission variable value.

19. The method of claim 16, wherein the step of initiating the pacing operation, further comprises the step of:

enabling the server to enter a suspend state in which the server ignores a subsequent pacing operation from the client computer system.

20. The method of claim 15, further comprising the step of:

modifying a state of the pacing coordination variable value to have a current pacing coordination variable value after the time period has passed.

21. The method of claim 20, further comprising the step of:

transmitting a transmission variable value from the server to the client computer system, wherein a state of the transmission variable value corresponds to the state of the current pacing coordination variable value.

22. The method of claim 21, further comprising the step of:

recommencing transmission of the plurality of information values from the server to the client computer system when the transmission variable value is transmitted from the server to the client.

23. A method for operating a client computer system while a server is communicating a plurality of information values with the client computer system, comprising the steps of:

i. receiving the plurality of information values from the server;

ii. storing the plurality of information values in a buffer pool of the client computer system;

iii. determining a first number of data values stored in the buffer pool of the client computer system;

iv. repeating steps i. through iii. when the first number of data values stored in the buffer pool is below a buffer threshold level; and v. transmitting a pacing message to the server when the first number of data values stored in the buffer pool is above the buffer threshold level.

24. The method of claim 23, further comprising the steps of:

vi. calculating a wait period to indicate a period of time the server should wait before commencing to transmit the plurality of information values after the pacing message is received by the server; and vii. transmitting the wait period to the server in the pacing message.

* * * * *